(12) United States Patent
Jones

(10) Patent No.: US 7,273,194 B1
(45) Date of Patent: Sep. 25, 2007

(54) WEAPON GUIDANCE SYSTEM

(75) Inventor: Malcolm D Jones, Stevenage (GB)

(73) Assignee: BAE Systems plc, Farnborough, Hampshire (GB)

( * ) Notice: Subject to any disclaimer, the term of this patent is extended or adjusted under 35 U.S.C. 154(b) by 0 days.

(21) Appl. No.: 07/409,512

(22) Filed: Sep. 30, 1989

Related U.S. Application Data

(63) Continuation of application No. 07/099,130, filed on Sep. 8, 1987, now Pat. No. 7,188,801.

(30) Foreign Application Priority Data

Sep. 8, 1986 (GB) .................................. 8621599

(51) Int. Cl.
*F42B 15/01* (2006.01)
*F42B 15/10* (2006.01)
*F41G 7/00* (2006.01)
*G01S 13/00* (2006.01)

(52) U.S. Cl. ...................... 244/3.19; 244/3.1; 244/3.15; 342/61; 342/62; 102/384

(58) Field of Classification Search ................ 102/384, 102/382; 244/3.15, 3.16, 3.19, 3.1–3.3; 342/61–65, 342/82–103, 118, 128–133
See application file for complete search history.

(56) References Cited

U.S. PATENT DOCUMENTS 3,107,070 A * 10/1963 Willits et al.
4,103,847 A * 8/1978 Thomas et al.

\* cited by examiner

*Primary Examiner*—Bernarr E. Gregory
(74) *Attorney, Agent, or Firm*—Nixon & Vanderhye P.C.

(57) ABSTRACT

The centroid of the discrete components forming the overall radar return from a target onto which a homing weapon is being guided may not coincide with a desired aimpoint on the target. Herein proposed is the discrimination and comparison of returns from different portions of the weapon sensor's field-of-view, i.e. different portions of the target and guidance of the weapon in dependence upon the relative values of the differences between those returns. As a result, the weapon can hit say the center of a tank turret roof rather than the probably heavily armored area forward of the turret roof.

3 Claims, 3 Drawing Sheets

US 7,273,194 B1

WEAPON GUIDANCE SYSTEM

This is a continuation of application Ser. No. 07/099,130, filed Sep. 8, 1987 now U.S. Pat. No. 7,188,801.

BACKGROUND OF THE INVENTION

1. Field of the Invention

This invention relates to a guidance system for a missile or projectile, for example a terminally-guided mortar shell.

2. Discussion of Prior Art

One proposed guidance system comprises a target sensor including a steerable dish antenna coupled via a transceiver to a series of range gates which discriminate components of the return signal reflected from points within a series of range bands and enters these components into respective appropriate ones of a series of range channels of the system. The antenna is steered to execute a scan pattern over a field of view of the sensor. It has been proposed for such a system to have a resolution sufficient, at least when the projectile gets near to a target, to be able to discriminate returns from different portions of the target. A target tracking sub-system can then use the return signals to derive reflector steering signals which maintain the reflector tracked, not merely onto the target, but rather onto some desired aim-point on the target. The target return, say from a tank, comprises a series of discrete components returned from respective reflective items or features distributed over the target, probably along with some ground clutter returns and spurious signals. There have been proposed various ways of processing in the return signals with a view to guiding the weapon onto the preferred aim point in the face of difficulties arising from the possibly uneven distribution of the reflective items on the target and the clutter and spurious signals. The object of this invention is to provide a guidance system incorporating an alternative form of signal processing which, in some situations, may be preferred.

SUMMARY OF THE INVENTION

According to one aspect of the invention, there is provided a system for guiding a weapon onto a preferred aim point upon a target, the system comprising target sensing means which is operable for discriminating between signals received from within a first portion of the field-of-view of the sensor and signals received from within respective ones of two further portions of said field-of-view, the two further portions being at respective opposite sides of said first portion, the system further comprising guidance signal forming means for forming a weapon guidance signal which is dependent upon the relative values of the differences between the signals from said first portion and respective ones of the signals from the two further portions.

According to a second aspect of the invention, there is provided a system for forming a pitch guidance signal for a weapon travelling in an inclined direction down onto a target, the system comprising target sensor means which is operable to discriminate between signals received from within respective ones of first, second and third portions of the field-of-view of the sensor means, said portions being displaced one from another along the direction crossing said field-of-view parallel to the pitch plane of the weapon with the first portion between the second and third portions, and said system further comprising means for combining said signals to form a pitch guidance signal which is dependent upon the relative values of the difference between the signals from the first and second portions and the difference between the signals from the first and third portions.

According to a third aspect of the invention, there is provided a system for guiding a weapon travelling in an inclined direction down onto a target, the system comprising target sensor means, means for determining the change in the sensor signal along a direction crossing the target, and guidance signal forming means for guiding the weapon towards an aim point referenced to the position of maximum rate of said change.

BRIEF DESCRIPTION OF THE DRAWINGS

For a better understanding of the invention, reference will now be made, by way of example, to the accompanying drawings, in which:—

DETAILED DISCUSSION OF EMBODIMENTS

Figure 1:
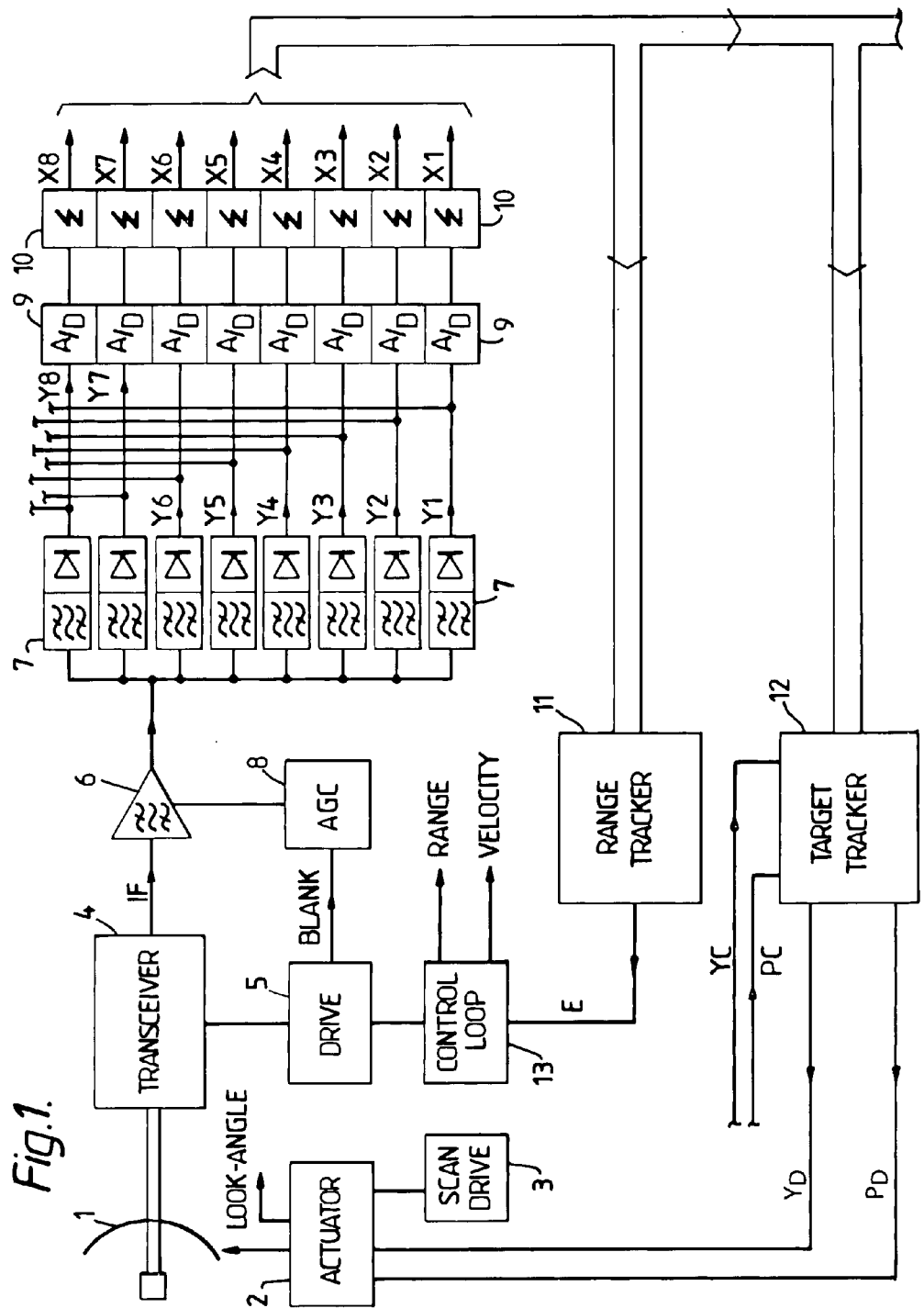
FIG. 1 is a simplified circuit diagram of part of a guidance system for a terminally guided mortar bomb.

Referring to FIG. 1, the guidance system comprises a millimetric, linearly frequency-modulated, continuous-wave (FMCW) radar system including a narrow beam dish reflector 1 mechanically coupled to an actuator sub-system 2 which is able to vary the look direction of the reflector relative to the weapon and, in response to signals from a scanning control sub-system 3, to move the reflector so that the transmitted beam traces out a scan pattern referenced to a controllable mean beam position or scan pattern symmetry centre. The reflector is fed by a homodyne transceiver 4 of which the output frequency is modulated by modulation drive 5. Transceiver 4 comprises a mixer which produces an IF signal representative of the radar return signal and this IF signal is fed out via an IF amplifier 6 to a bank of eight range gates 7, each gate comprising a band-pass filter and a detector. The respective filter pass bands are set for the range gates to discriminate return components from respective contiguous range bands, each equal to a small fraction of the mean target range. Amplifier 6 is gain controlled by an AGC circuit 8, this circuit being also responsive to a blanking control signal during the flyback periods between successive linear frequency sweeps of the transceiver output. The outputs Y1 to Y8 from the range gates are sampled and digitised by respective ones of a bank of A/D converters 9. The digitised samples from the converters 9 are passed to respective summing units 10 which each sums a pre-determined number of consecutive samples and then dumps the sum value to the output before starting to sum the next same number of samples, dumping that sum value, and so on. The sum values X1 to X8 are passed to each of a short-range target range tracking sub-system 11 and a short-range target tracking sub-system 12. The function of the range tracking sub-system 11 is to form a range error signal E indicative of any offset, from the centre of the bank of range bands discriminated by gates 7, of the desired aim-point on the target. This error signal is then used by a control loop circuit 13 to control the phase of the modulation signal produced by drive 5 so as to reduce the error signal, ie so as to maintain the target centred in the discriminated range bands. Meanwhile, the target tracking sub-system 12 produces pitch and yaw demand signals PD and YD which control the actuator sub-system 2 to maintain the mean beam position, ie the symmetry centre of the scan pattern, aligned with the desired aim point.

Some or all of the outputs Y1 to Y8 and/or X1 to X8 may be passed to other sub-systems (not shown) of the overall guidance system, for example to various long and mid range tracking sub-systems and a target recognition sub-system. In addition, the overall system would normally comprise a weapon guidance sub-system (not shown) which actually navigates the weapon to intercept the target, using for this purpose range and range rate (velocity) signals provided by control loop circuit 13 and antenna look-angle signals made available by the actuator sub-system 2. Such other sub-systems and the weapon guidance sub-system do not form part of the subject-matter of the present specification and hence will not be described further. The same applies to the range tracker sub-system 11.

Figure 2:
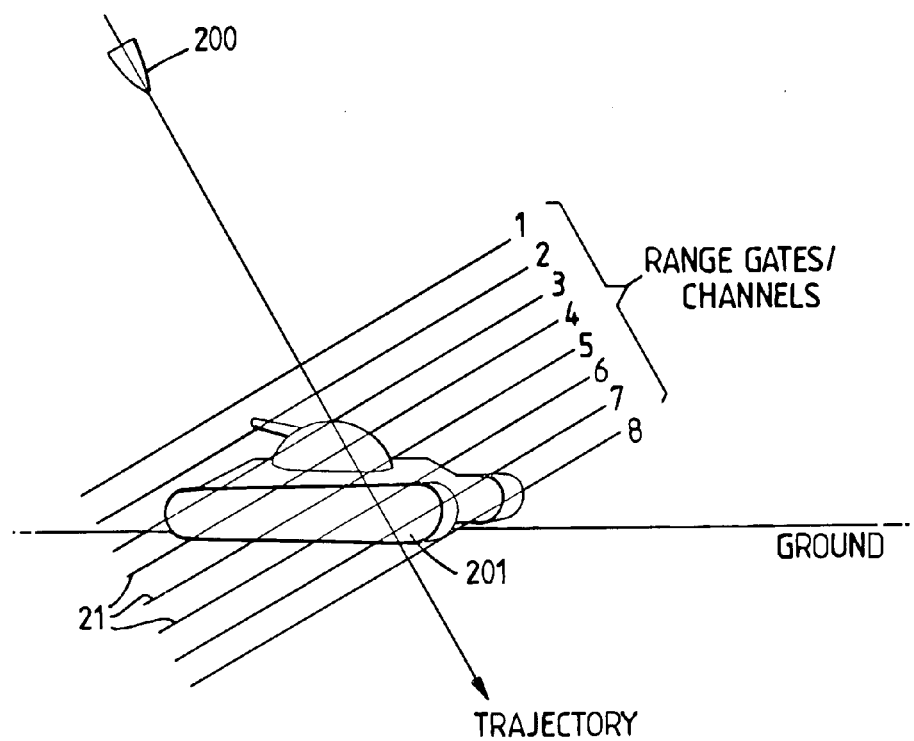
FIG. 2 is a diagram showing a bomb approaching a target.
Figure 3:
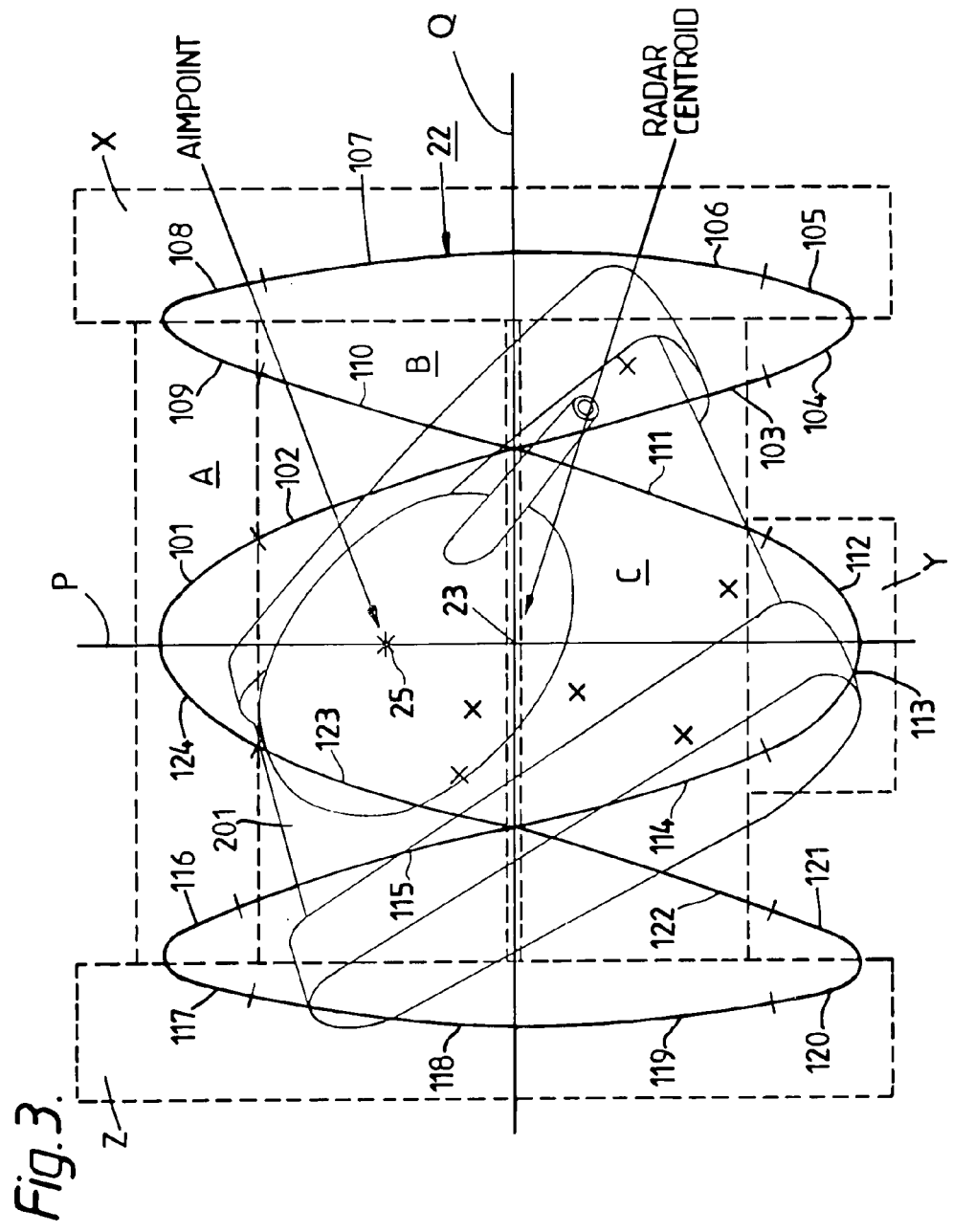
FIG. 3 is a diagram showing the target as seen from the approaching bomb.

FIG. 2 shows a weapon 200 approaching a target 201 while FIG. 3 the view, from the approaching weapon, of the target 201. The lines 21 represent the divisions between the range bands discriminated by range gates 7. Line 22 shows the scan pattern traced out by the beam from reflector 1. The pattern consists of a 3:1 Lissajous figure obtained by oscillating the reflector relative to the weapon, through equal angles but at different frequencies in pitch and yaw. The radar return signal comprises the resultant of discrete reflections from particular target features, possibly together with some ground clutter returns from around the target. The ideal aim point 25 is at the centre of the top of target as it is seen from the fairly steeply descending weapon. On a tank, this aim point would thus lie on its turret. However, the centroid of the target returns may lie at point 23, say.

Within the short range target tracking sub-system 12, which comprises a computer, preferably a microprocessor based computer system, a time division operation is carried out, in effect, so as to divide the Lissajous scan pattern of FIG. 3 into twenty four parts, referenced 101 to 124 in FIG. 3, which are traced out during respective equal intervals, ie during respective intervals each equal to one twenty fourth of the scan pattern execution period. The signals received during the fourth to the eighth, the twelfth and thirteenth, and the seventeenth to the twenty-first intervals, ie the signals received from portions X, Y and Z of the field-of-view defined by the scan pattern (near pattern portions 104 to 108, 112, 113 and 117 to 121) are not made use of. In addition, only the signals in the first (nearest) five of the eight range channels are used. Consideration of FIG. 2 will show that these signals which are not used are those most likely to be unduly affected by clutter and spurious returns.

Then in order to obtain a pitch error signal, ie a signal which will be used by a main tracker loop function executed by tracker 12 to form the demand signal PD for adjusting the centre of the scan pattern along the line P in FIG. 3, the signals in the five used range channels received during the first, ninth, sixteenth and twenty-fourth intervals, ie all the signals arriving from within the portion A of the area covered by the scan pattern, which portion is covered by pattern portions 101, 109, 116 and 124, are summed. For the purpose of this description, the summed value is designated sum value A. Similarly the signals from portion B of the area, containing pattern portions 102, 110, 115 and 123, are summed to give sum value B while the signals from area portion C, containing pattern portions 103, 111, 114 and 122, are summed to give sum value C.

The distribution of the return signals from a target like that shown is such that moving from point 23 towards and past point 25, the average return signal tends to decrease in amplitude from a peak over the target centroid 23 and the aim point 25 lies close to a region where the decrease has a maximum gradient. This is especially so in the present case where the three longer range channel signals are not used. In effect, the tracker system 12 tries to move the scan pattern centre onto this region of maximum gradient. It does this by forming a pitch error signal which so guides the mean scan position of the antenna dish that the difference between sum values A and B becomes equal to the difference between sum values B and C, ie the pitch error PE is calculated as:—

$$PE = \frac{K_1(2B - A - C)}{(A + B + C + 1)}$$

In this expression, the denominator is a normalisation factor while $K_1$ is a scale factor for matching the pitch error to the main tracking loop.

The tracker 12 also calculates the yaw error of the scan pattern centre, ie in order to produce a signal which will be used to guide the mean antenna dish position in the direction of line Q in FIG. 3. Whereas the pitch error is calculated by discriminating the gradient of the sum signal waveform along line P, the yaw error YE is simply calculated as:—

$$YE = \frac{K_2(E - F)}{(E + F + 1)}$$

Where E is the sum of the five range channel signals received from the area portion E defined by scan pattern portions 102, 103, 110 and 111; F is the sum of the five range channel signals received from area portion F defined by scan pattern portions 114, 115, 122 and 123, and $K_2$ is another scale factor for matching the calculated error to the tracker loop. As before, the denominator in the above expression is a normalisation factor.

It will be appreciated that the yaw error calculation could be done in a way other than that defined above, while still using the same form of pitch error calculation. As noted, the denominators in the expressions for YE and PE are normalisation factors. Alternative factors could be chosen if desired, for example, the denominator (A+C) could be used in which case much the same overall result is achieved provided the scale factors $K_1$ and $K_2$ are adjusted accordingly.

The numerator in the expression for PE could be changed (while still effectively discriminating gradient) so as to adjust the null point along line P. For example, it could be changed to (5B−3A−2C)

This, in general, gives a small positive error signal for conditions under which a (2B−A−C) discriminator would be balanced.

The illustrated scan pattern could be replaced by another form of pattern, for example a Lissajous figure with only two lobes or one with more than three lobes. Instead of a scanning sensor system, a sensor comprising a pattern of fixed detectors could be used.

The number of used range channels could be more or less than five or the number could be changed with time or range to target.

The pattern portions which are not used, ie the ignored area portions X and Y, could be changed to adapt the system for situations where the likely clutter sources differ from those assumed in the case of the described example.

Instead of being a computer system, the target tracking sub-system 12 could comprise respective circuit items (not shown) dedicated to carrying out particular calculations as described.

The exemplary system shown is an FMCW system and the range gates 7 include range filters but this is not essential. Instead, a pulse radar system could be used and then the range filters would be replaced by suitable time slot gates.

In fact, the invention is not limited to a radar system having range gating or any other radar system. Thus, the radar system could be of the non-range discriminating type or the guidance system could comprise a passive target sensor, or a sonar sensor, or say an optical sensor.

The invention claimed is:

1. A system for guiding a weapon onto a preferred aim point upon a target, the system comprising:

target sensing means having a field of view for discriminating between signals received from within a first portion of said field-of-view of said sensing means and signals received from within respective ones of two further portions of said field-of-view, the two further portions being at respective opposite sides of said first portion, said target sensing means including receiving means, responsive to reflected radiation from said target, having a movable look direction;

means for controlling said look direction of said receiver means by a pitch input and a yaw input, and guidance signal forming means for forming a weapon guidance signal which is dependent upon the relative values of differences between the signals from said first portion and respective ones of the signals from the two further portions.

2. A system for forming a pitch guidance signal for a weapon travelling in an inclined direction down onto a target, the system comprising:

target sensing means having a field of view, for discriminating between signals received from within respective ones of first, second and third portions of the field-of-view of the sensing means, said portions being displaced one from another along the direction crossing said field-of-view parallel to a pitch plane of the weapon with the first portion between the second and third portions said target sensing means including receiving means, responsive to reflected radiation from said target, having a movable look direction;

means for controlling said look direction of said receiver means by a pitch input and a yaw input, and means for combining said signals to form a pitch guidance signal which is dependent upon the relative values of the difference between the signals from the first and second portions and the difference between the signals from the first and third portions.

3. A system for guiding a weapon travelling in an inclined direction down onto a target, the system comprising:

target sensing means for providing a sensing means signal, said target sensing means including receiving means, responsive to reflected radiation from said target, having a movable look direction;

means for controlling said look direction of said receiver means by a pitch input and a yaw input;

means for determining the change in the sensing means signal along a direction crossing the target; and guidance signal forming means for guiding the weapon towards an aim point referenced to the position of maximum rate of said change.

* * * * *